United States Patent [19]

Czyryk

[11] 3,931,860

[45] Jan. 13, 1976

[54] LOW-PROFILE PLATFORM SCALE

[75] Inventor: Chester S. Czyryk, Silver Lake, Wis.

[73] Assignee: Mangood Corporation, Chicago, Ill.

[22] Filed: Apr. 7, 1975

[21] Appl. No.: 565,681

Related U.S. Application Data

[63] Continuation-in-part of Ser. No. 511,426, Oct. 2, 1974, Pat. No. 3,894,595.

[52] U.S. Cl. .............................................. 177/257
[51] Int. Cl.² .......................................... G01G 21/08
[58] Field of Search ............................. 177/255–257

[56] References Cited
UNITED STATES PATENTS

| | | | |
|---|---|---|---|
| 3,369,621 | 2/1968 | Hutchinson et al. ............... | 177/257 |
| 3,465,838 | 9/1969 | Kienzle et al. ...................... | 177/256 |
| 3,658,142 | 4/1972 | Marshall et al. ................... | 177/256 X |
| 3,658,143 | 4/1972 | Schwartz............................. | 177/255 X |
| 3,666,032 | 5/1972 | Maffia et al. ....................... | 177/256 |

*Primary Examiner*—George H. Miller, Jr.
*Attorney, Agent, or Firm*—Claron N. White

[57] ABSTRACT

A low-profile platform scale has a horizontal base, a lower primary U-shaped lever, an upper secondary U-shaped lever, a horizontal platform, and load cell means mounted on the base. The base has a unitary structure including a front pair and a rear pair of modified vertical angle irons connected to the ends of a horizontal shallow rectangular tubing and supporting short inverted channel irons each with one leg shorter than the other, to provide a pair of spaced upstanding portions of the base at the central part of the front and rear margins of the base with a portion of the short flanges and a portion of the long flanges of the pair of channel irons providing mounting means at upper and lower elevations as vertical flat surfaces facing the ends of the scale. These flat surfaces are at two transverse vertical planes. The lower and upper levers are constructed primarily of rectangular tubing connected in a unitary manner with the levers pivotally mounted by flexure plates on these vertical surfaces of the channel irons of the base with the pairs of lever arms of the levers extending in opposite directions to the corner portions of the scale. The primary lever has another rectangular tubing in its unitary construction as an intermediate arm extending opposite direction to its pair of levers. The secondary lever has a short intermediate extension in opposite direction to its pair of lever arms and above the intermediate arm of the primary lever. That extension is connected by a flexible cable to the intermediate arm of the primary lever. The distal end portion of the intermediate arm is connected by a flexible cable to the load cell. The platform has a unitary construction including a horizontal rectangular hollow ring having front and rear portions and end portions, downwardly extending vertical angle irons connected to the ring at its corners, front and rear rods between and connected to the bottom portions of the vertical angle irons, and a pair of tubes at the end portions of the platform between and connected to the bottom portions of the angle irons and extending below the distal portions of the lever arms of the primary and secondary levers. This pair of tubes are connected to the pairs of lever arms of the two levers by flexible cables.

8 Claims, 20 Drawing Figures

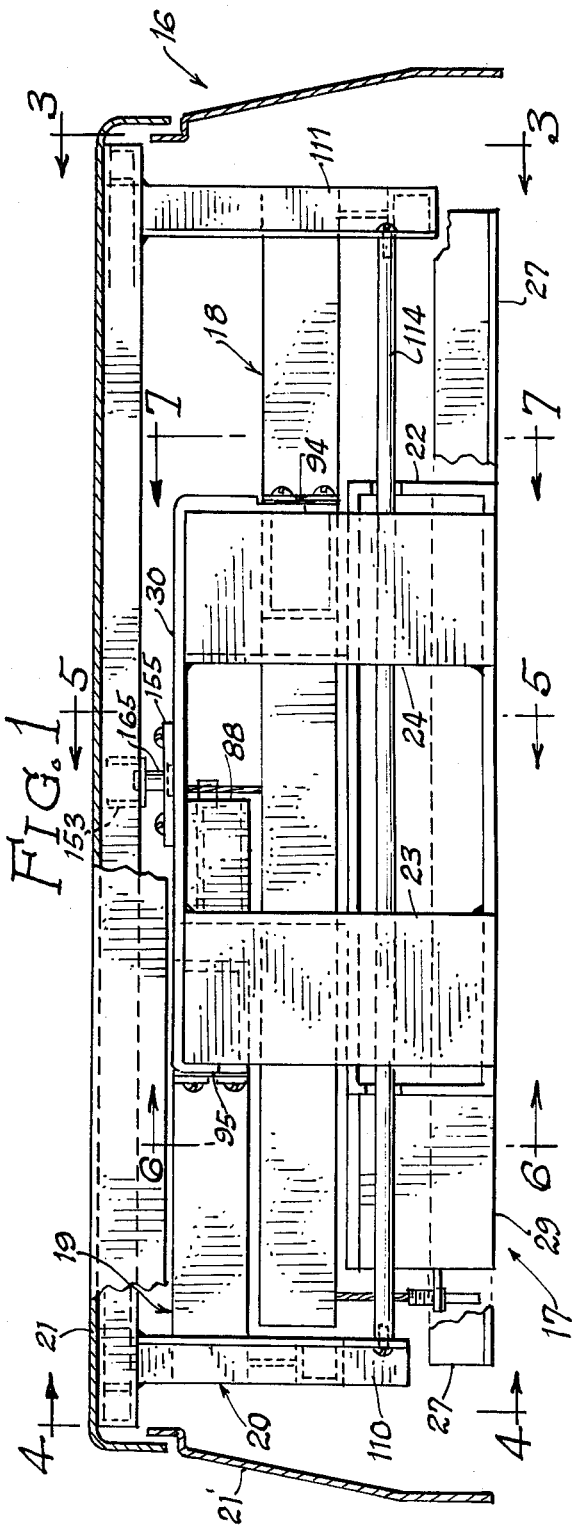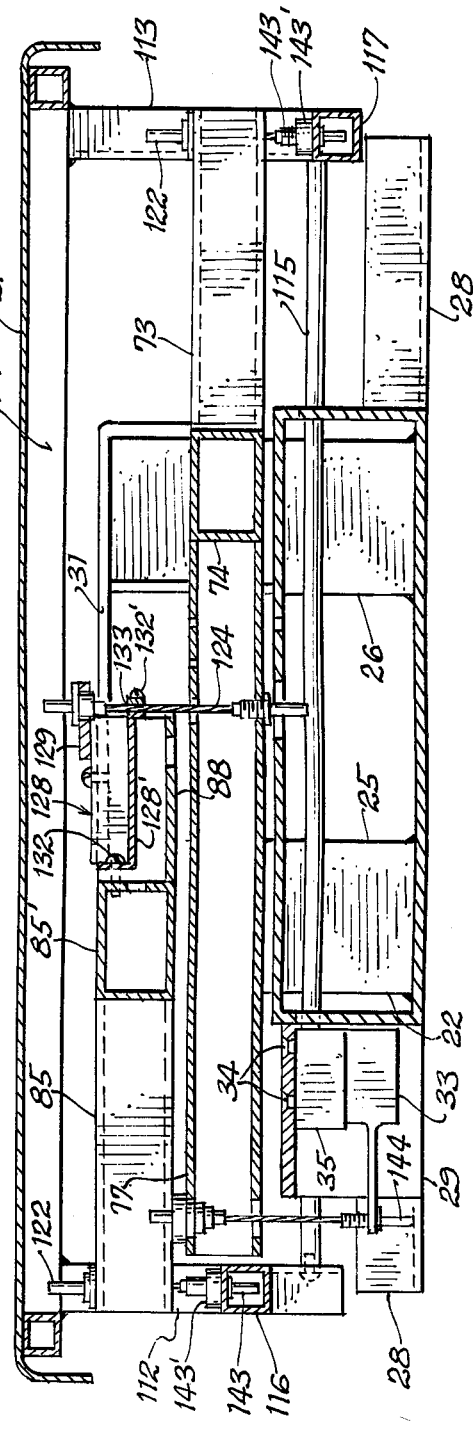

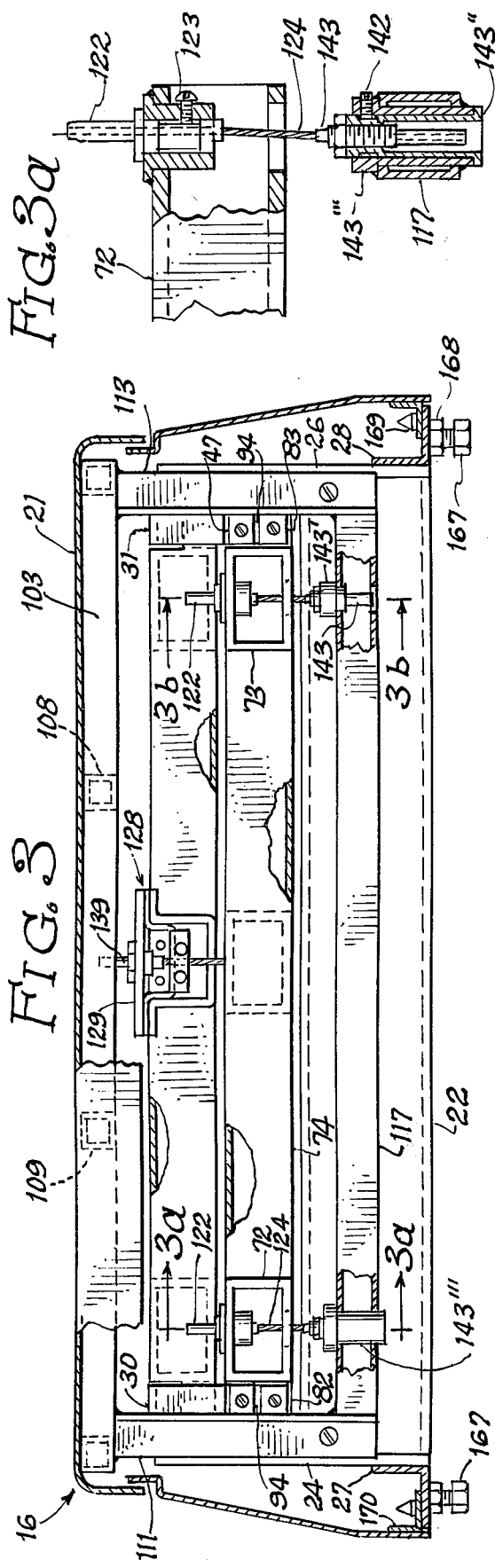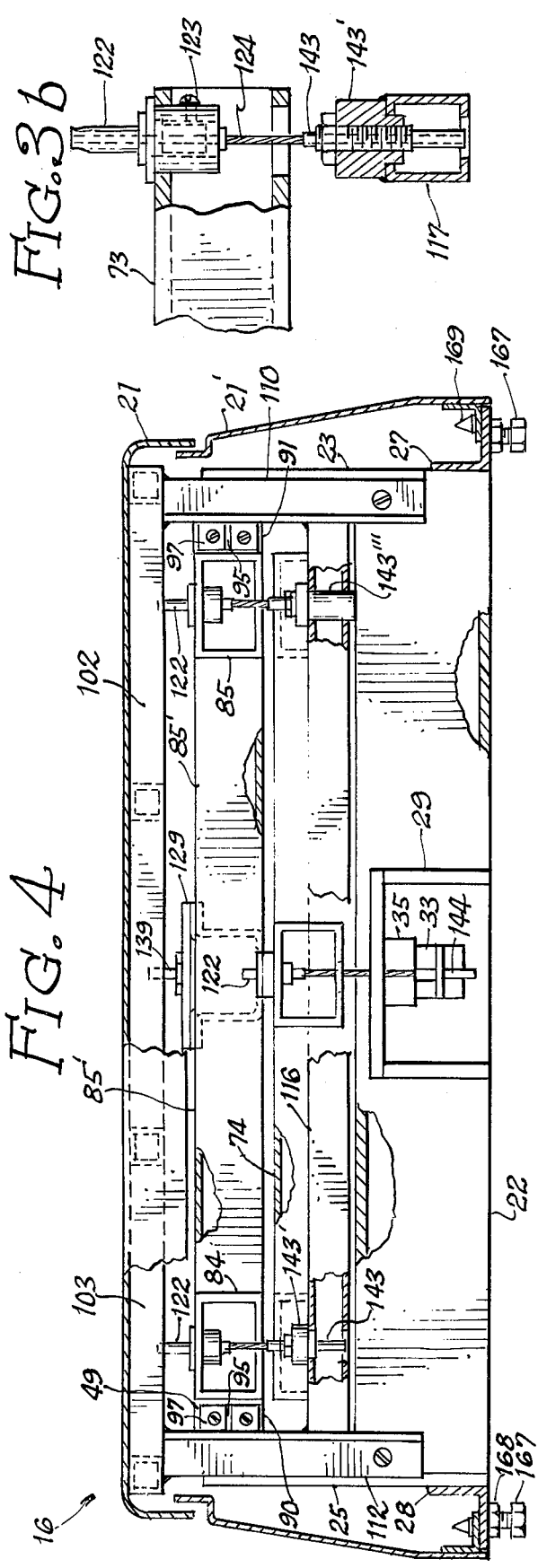

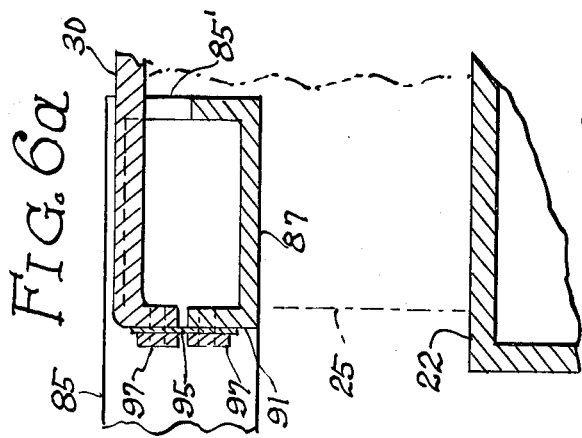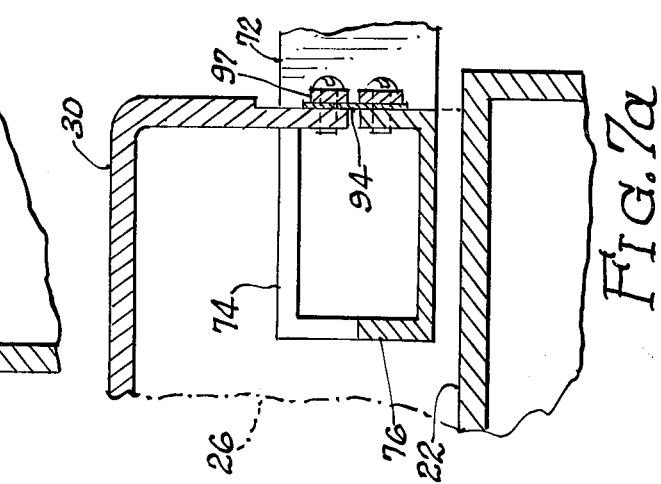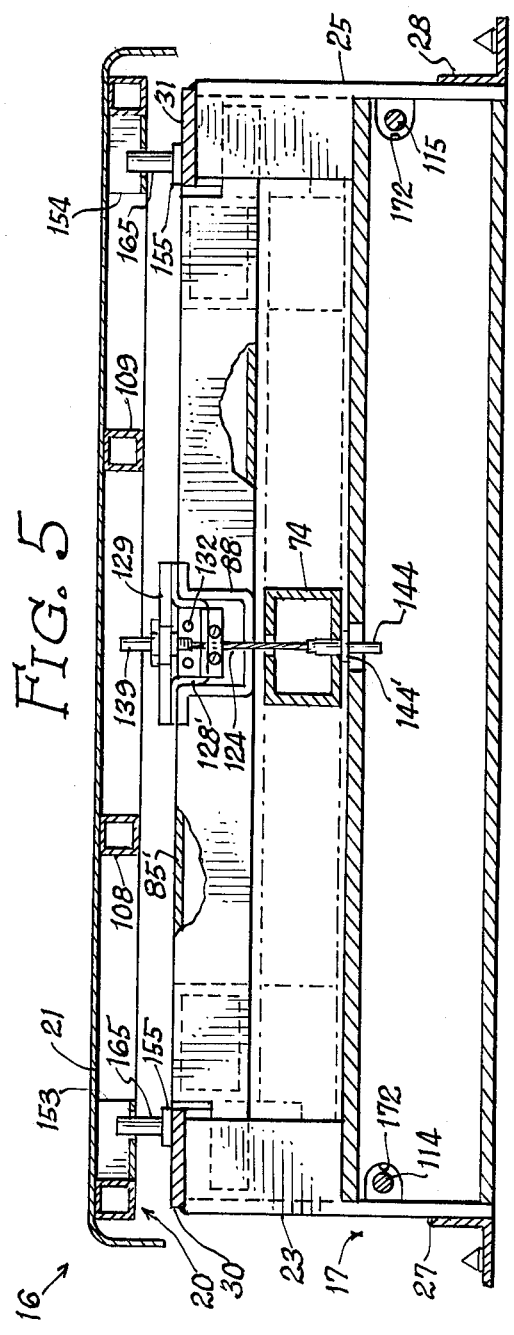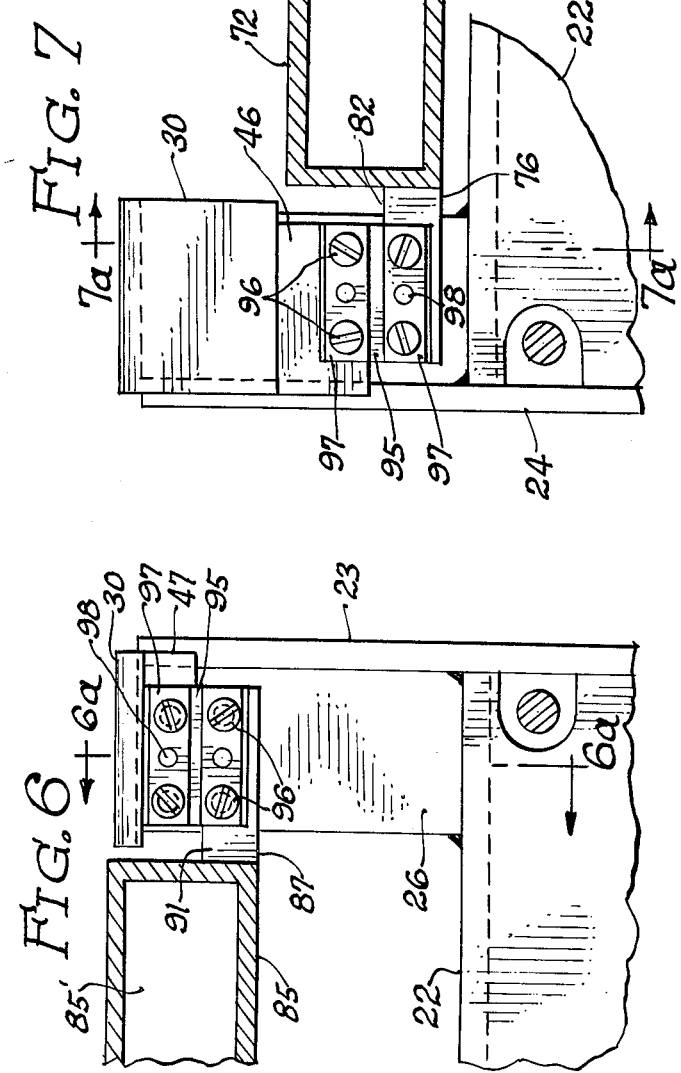

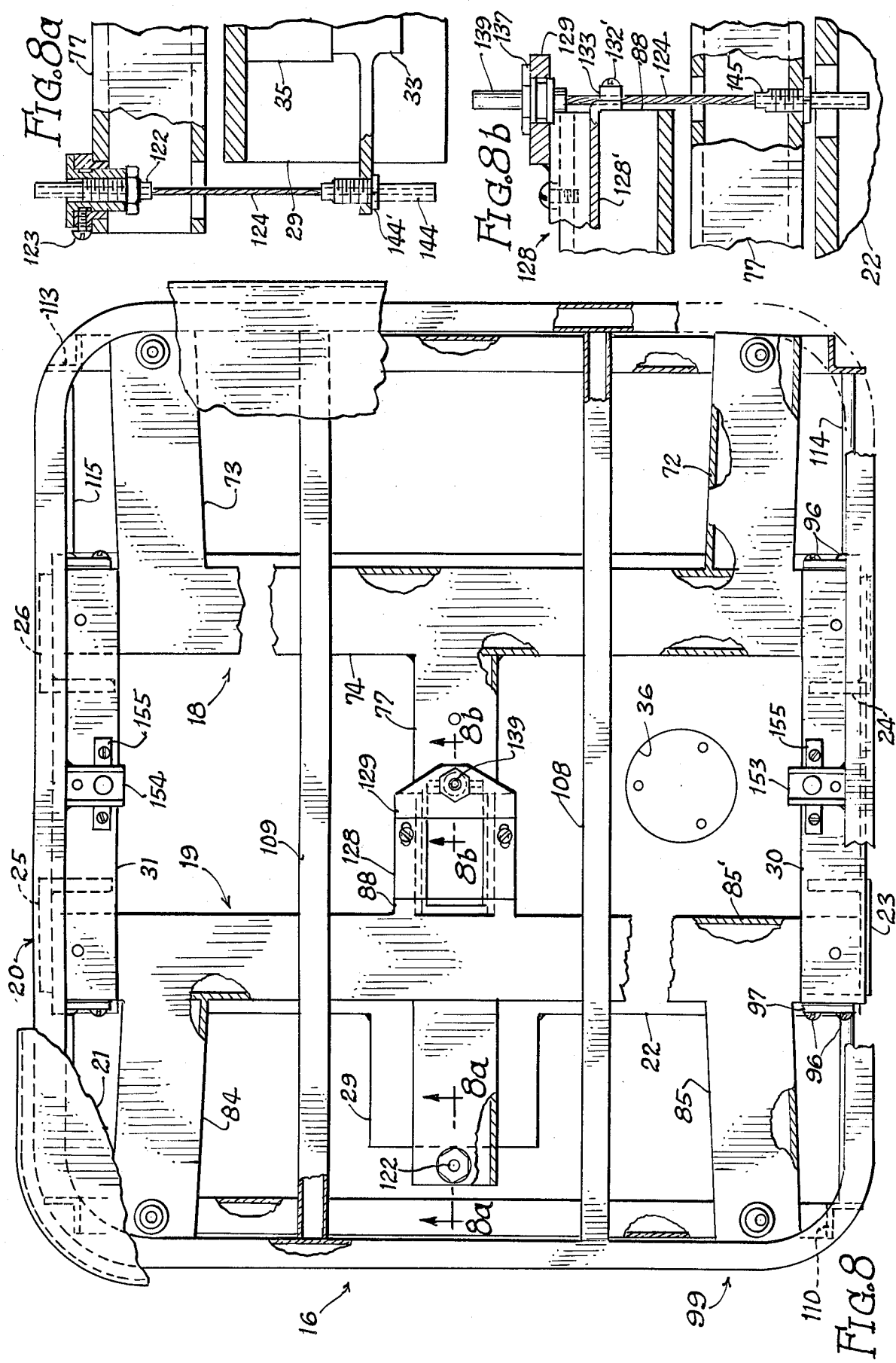

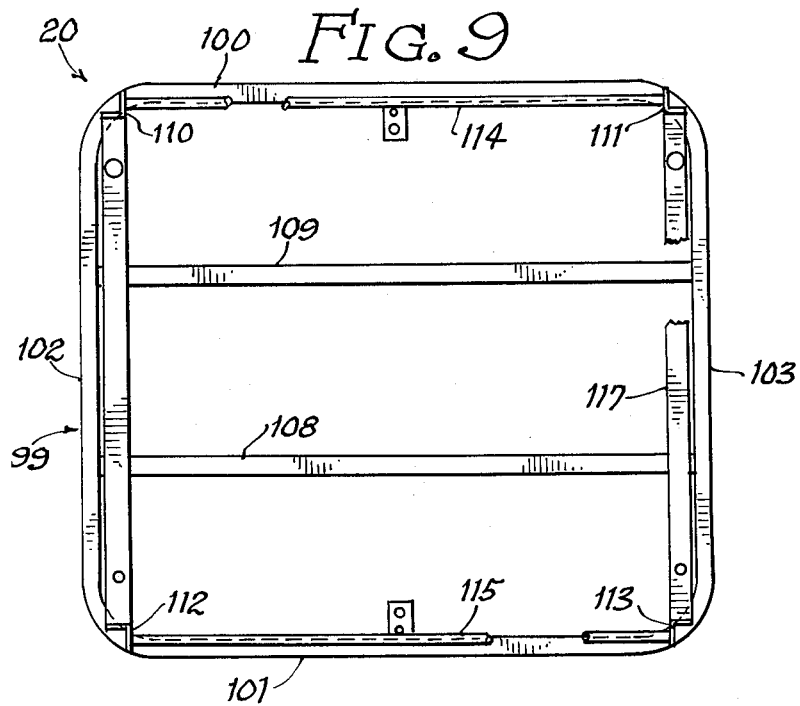
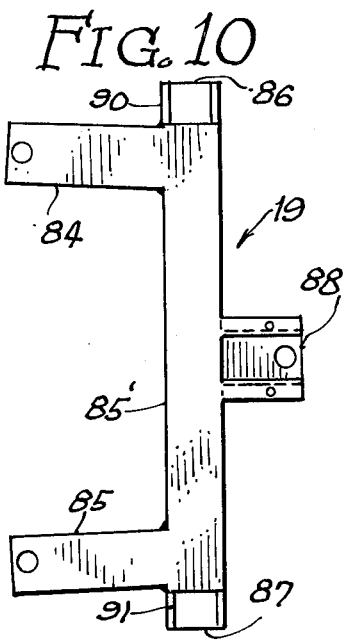
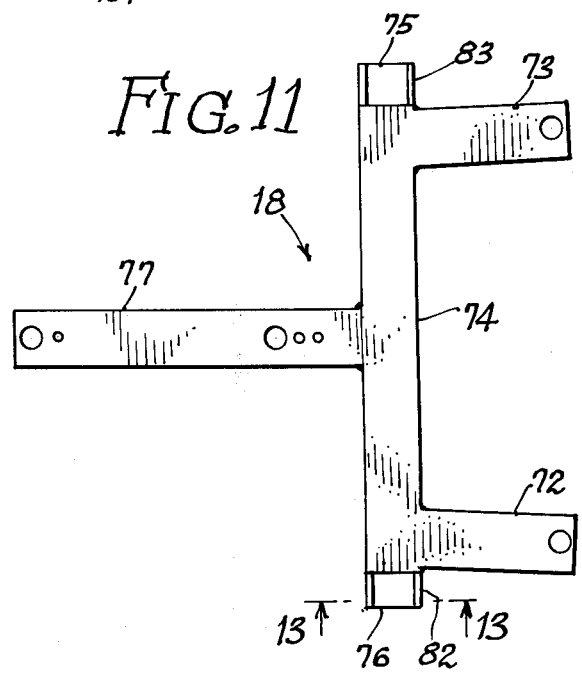
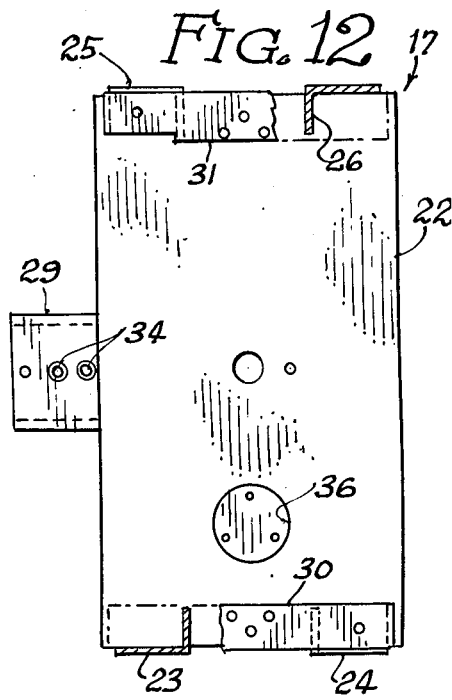
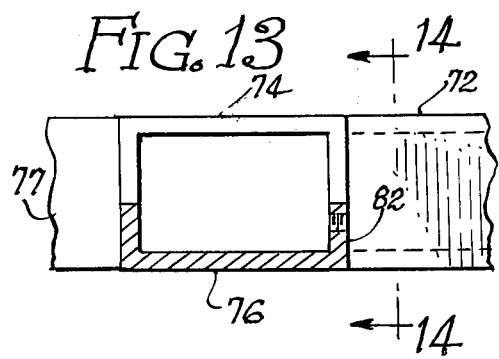
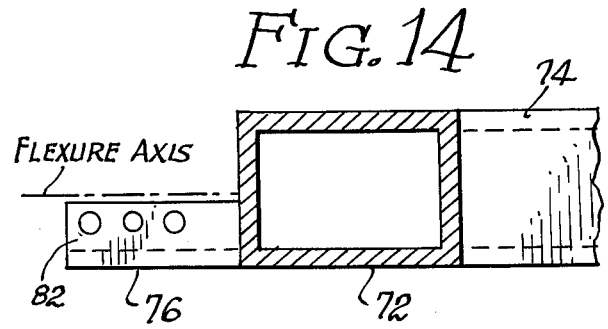

LOW-PROFILE PLATFORM SCALE

CROSS-REFERENCE TO RELATED APPLICATION

This patent application is a continuation-in-part of my patent application Ser. No. 511,426, filed Oct. 2, 1974, now U.S. Pat. No. 3,895,595, and entitled Low-Profile Platform Scale.

BACKGROUND OF THE INVENTION

1. Field of the Invention

This invention relates to a low-profile platform scale containing levers, flexure plates, flexible cables and a load cell.

2. Description of the Prior Art

U.S. Pat. No. 3,658,143 describes and claims the most pertinent scale of the prior art. The abstract of the patent states that it is a patent for a platform scale "having a simple lever system utilizing flexure plates and flexible cables to transmit forces from the platform to a hydraulic load cell to produce a hydraulic output signal having a pressure corresponding to the weight of an object placed on the platform."

The construction of the scale of that patent is adequately described in my copending patent application mentioned above.

SUMMARY OF THE INVENTION

The low-profile platform scale of the present invention has the basic construction of the scale claimed in my said copending patent application. It is a construction containing a horizontal base, a platform, a pair of U-shaped levers, flexure plates, flexible cables or the like, and a load cell. As thus broadly stated it is similar to the platform scale of the patent mentioned above but it has many differences that are described in my said copending patent application.

The scale of the present invention has the construction claimed in that copending patent application, i.e., a platform scale comprising: a horizontal base; a primary U-shaped lever; a secondary U-shaped lever; a horizontal platform; and load cell means. In the construction the primary U-shaped lever has in a unitary construction an elongated mounting member, a pair of lever arms extending horizontally from the same side of said mounting member adjacent its ends, and an intermediate arm extending horizontally from said mounting member in a direction that is normal to the longitudinal axis of said mounting member and from the side of said mounting member that is opposite to the side from which said pair of lever arms extend. The secondary U-shaped lever has in a unitary construction an elongated mounting member and a pair of lever arms extending horizontally from the same side of said mounting member adjacent its ends, said mounting member having an intermediate portion extending horizontally and normal to the longitudinal axis from the side of said mounting member that is opposite to the side from which said pair of lever arms of said secondary lever extend. The scale includes means connected to said base and to said mounting member of said primary lever to pivotally mount that mounting member at a horizontal axis that is at a lower elevation above the central transverse portion of said base, with the longitudinal axis of that mounting member at a vertical plane transverse to the longitudinal axis of said base and with the distal end portions of said pair of lever arms of said primary lever above the front and rear corner portions of one end of said base. The scale also includes means connected to said base and to said mounting member of said secondary lever to pivotally mount that mounting member at a horizontal axis that is at an upper elevation above the central transverse portion of said base, with the longitudinal axis of that mounting member at a vertical plane transverse to the longitudinal axis of said base and passing through said intermediate arm of said primary lever, with the said extension of said intermediate portion of said mounting member of said secondary lever directly above said intermediate arm of said primary lever, and with the distal end portions of said pair of lever arms of said secondary lever above the front and rear corner portions of the other end of said base. In addition there are as a part of the scale: force-transmitting means connected to the corner portions of said platform and to the distal end portions of said pairs of lever arms of said levers to support said platform above said lever arms; and force-transmitting means connected to said intermediate extension of said mounting arm of said secondary lever and to said intermediate arm of said primary lever. The load cell means are mounted on said base adjacent its said other end and below the distal end portion of said intermediate arm of said primary lever, and there are force-transmitting means connected to said distal end portion of said intermediate arm and to said load cell means to provide a stress in said load cell means when said intermediate arm is raised.

The foregoing construction of the platform scale of the invention of said copending patent application, that is hereby expressly incorporated in toto by reference as a part of the present application, is exemplified in that patent application by a specific embodiment of construction that was the preferred embodiment. That disclosed embodiment of construction had, as the means connected to said base and to said mounting members of said primary and secondary levers for the pivotal mounting of the levers, front and rear upstanding portions at the central part of the front and rear margins of the base. These upstanding portions have vertical flat surfaces at upper and lower elevations facing opposite ends of the scale. The mountings means further included a pair of flexure plates mounted on those vertical faces and connected to the primary and secondary levers for pivotal mounting. This horizontal base of the preferred embodiment disclosed in said copending patent application includes these front and rear upstanding portions as a cast and appropriately machined article of manufacture. To provide the required rigidity to these upstanding portions the horizontal base is required to have integral gussets from the upstanding portions to the horizontal portion of the base, i.e., grid members that are interconnected by a grid construction of the base as the horizontal portion of the base.

Similarly, the platform in that preferred embodiment is disclosed as having an unitary grid construction from which legs extend downwardly at the corners and these legs at their bottom have horizontal extensions to which the distal ends of the arms of the levers are connected by flexible cables. In addition the platform required gussets integral with the vertical portion of the feet and their horizontal extensions to provide structural rigidity.

It was contemplated in this preferred embodiment of construction of the scale of the invention of said copending patent application that the base and the platform as well as the primary and secondary levers would be made as cast articles that would be properly machined to provide the required flat surfaces. However, such specific construction is costly especially when it is desired to have a family of platform scales of the invention of said copending patent application.

In view of the foregoing disadvantages of the specific embodiment of construction of the scale disclosed and claimed in my said copending patent application the construction was modified to avoid a casting of components of the scale but still provide adequate rigidity and yet would be suitable to construct a family of low-profile scales having different ranges of weight capacity. The modified construction is the low-profile platform scale of the present invention that is described below.

The low-profile scale of the present invention has the construction described above as claimed in said copending patent application, in which some components are made from commercially available products, specifically tubes, channel irons and angle irons. As a result it is relatively easy to fabricate these components from the commercially available products for the family of platform scales by choosing from available products those having suitable dimensions.

For example, the base of the scale uses in its construction a shallow rectangular tubing and two pairs of angle irons that are united to the rectangular tubing at its ends to provide the upright portions of the base. In this construction each of the angle irons has an end portion of one of its flanges removed so that the end portion of one flange abuts one end of the shallow rectangular tubing while the other shorter flange extends inwardly above and upwardly from the top wall of the shallow rectangular tubing. These modified angle irons have their shorter flanges welded to the top surface of the shallow rectangular tubing and the unmodified flanges have their abutting end portions secured to the ends of the top and bottom walls of the shallow rectangular tubing, preferably also by welding for a simplified fabrication. When the shallow rectangular tubing is horizontal, as is the case when used in the scale, these pairs of angle irons extend vertically upward and the rectangular tubing is disposed so that its ends are at the front and rear portions of the scale. Thus one pair of the angle irons are at the front portion of the base and the other pair of angle irons are at the rear portion of the base. The rectangular tubing is easily cut, if necessary, to the proper length with its ends squared so that they are parallel to each other and thereby the vertical angle irons of each pair have their unmodified flanges parallel to each other to the other pair. The angle irons of each pair are spaced from each other for the reason described later, and they and the shallow rectangular tubing are at the central transverse portion of the base. A short inverted channel iron is mounted on the top of each pair of angle irons and secured to the top ends of the flanges of these angle irons by welding. Each channel iron has one leg shorter than the other. These legs are secured to the upper portion of the distal edge of the unmodified flange of the angle irons of the pair on which the channel iron is mounted. These legs have at least their bottom outer surface portions machined to provide vertical flat surfaces for the mounting of flexure plates on which are mounted the levers. The flat surfaces of the longer legs are coplanar. The flat surfaces of the shorter legs are coplanar. The base further includes horizontal elongated angle irons that are at the front and rear of the base and that are secured at these vertical flanges to the vertical angle irons secured to the ends of the shallow rectangular tubing. These horizontal angle irons extend beyond the shallow rectangular tubing to the four corner portions of the scale to provide by their horizontal flanges a mounting at those corner portions of adjustable screws for leveling of the scale.

The construction of the levers of the scale of the present invention also uses for each lever a number of commercially available products that are combined to form each lever. Most of these products are rectangular tubes as seen in the description that follows.

The primary U-shaped lever includes in its unitary construction a horizontal elongated rectangular tube as the mounting member, a pair of rectangular tubes as the pair of lever arms of the primary lever, and a rectangular tube as the intermediate arm of the primary lever. One of the ends of each of the pair of rectangular tubes abuts and is welded to the same side of the horizontal elongated rectangular tube to extend horizontally from that side of the elongated rectangular tube adjacent its ends. The intermediate rectangular tube abuts and is welded to the other side of the elongated rectangular tube and extends horizontally from it in a direction that is normal to the longitudinal axis of the elongated rectangular tube. The side of the elongated rectangular tube from which the pair of rectangular tubes extend has its ends machined to provide coplanar vertical flat surfaces and those ends are beyond the pair of rectangular tubes. These ends do not have the top wall and the top portion of the side walls of the rectangular tube. In the assembled scale those ends extend below the pair of inverted channel irons of the base and have their vertical flat surfaces below and coplanar with the vertical flat surfaces of the long legs of the two inverted channel irons of the base. On these vertical flat surfaces are mounted flexure plates that are also connected to the flat surface portions of these long legs of the inverted channel irons of the base. Thus the pivotal mounting of the primary lever is at the common fulcrum axis of these two flexure plates. This axis is at a lower elevation and is normal to the longitudinal vertical plane of the scale.

The secondary U-shaped lever includes in its unitary construction a horizontal elongated rectangular tube as a mounting member, a pair of rectangular tubes as the pair of lever arms of the secondary lever, and means extending horizontally from the intermediate portion of the elongated rectangular tube. One of the ends of each of the pair of rectangular tubes abuts and is welded to the same side of the horizontal elongated rectangular tube to extend horizontally from that side of the elongated rectangular tube adjacent its ends. The means extending from the intermediate portion of the rectangular tube abuts and is welded to the other side the elongated rectangular tube and that means extends horizontally from that tube in a direction that is normal to the longitudinal axis of the elongated rectangular tube.

For the secondary lever the side of the elongated rectangular tube from which the pair of rectangular tubes extend has its ends machined to provide coplanar vertical flat surfaces and those ends are beyond the pair of rectangular tubes. These ends do not have the top wall and the top portion of the side walls of the rectangular tube. In the assembled scale those ends extend below the pair of inverted channel irons of the base and have their vertical flat surfaces below and coplanar with the vertical flat surfaces of the short legs of the two inverted channel irons of the base. On these vertical flat surfaces are mounted flexure plates that are also connected to the flat surface portions of these short legs of the inverted channel irons of the base. Thus the pivotal mounting of the primary lever is at the common fulcrum axis of these two flexure plates. This axis is at an upper elevation and is normal to the longitudinal vertical plane of the scale. The means extending from the other side of the elongated rectangular tube is constructed to provide adjustable mounting of a ferrule to which one end of a flexible cable is secured while the other end of the cable is secured below to a ferrule mounted on the rectangular tube, that is the intermediate arm of the primary lever, at an intermediate position along its length.

The platform of the scale of the invention is still another one of the components of the scale, that is constructed from products that are commercially available with different dimensions. The platform includes a horizontal rectangular ring, preferably constructed from a length of a rectangular tube, a set of two pairs of vertical legs, each having at least two flanges normal to each, a pair of horizontal connecting rods, and a pair of horizontal members such as tubes, preferably rectangular tubes. This set of two pairs of vertical legs are welded at their top ends to the rectangular ring at its four corner portions and extend downwardly with one of the flanges of each of the four legs being parallel to the longitudinal axis and with the pair of horizontal tubes welded at their ends to those of these flanges that face each other. The connecting rods are connected at their ends to the second of these flanges of the legs so that one of the rods extends between the two front legs and the other extends between the two rear legs. The pair of horizontal members extend from and connect the front legs to the rear legs. One of the pair of horizontal members is at an upper elevation and the other one is at a lower elevation of the bottom portion of the legs.

The two horizontal members of the platform, that are connected at different elevations, are below the distal end portions of the lever arms of the primary and secondary levers. The horizontal member of this pair that is at the lower elevation is below the arms of the primary lever while the horizontal member at the upper elevation is below the arms of the secondary lever. On these distal end portions of the arms of the two levers are mounted an upper ferrule while a lower ferrule is mounted on the horizontal member directly below. Each of the sets of these two ferrules is part of an assembly with a flexible cable having its ends connected to an upper ferrule and to a lower ferrule so that a downward force by the platform is applied to the two arms of each of the levers through the two assemblies of the upper and lower ferrules and flexible cable. For each assembly the upper ferrule is mounted so that the position at which the cable extends downwardly from the upper ferrule is at the same horizontal plane as the fulcrum axis of the associated lever. Also each of the lower ferrules of the assemblies is mounted on the associated horizontal member connected to two legs of the platform in a manner such that with the elevation of that horizontal member the length, i.e., the pendulum length, of the flexible cable is the same for all four flexible cables.

The scale includes another assembly of two ferrules and flexible cable. The upper ferrule is adjustably mounted on means extending from the secondary lever and the lower ferrule is mounted on the intermediate arm of the primary lever, i.e., is mounted on its intermediate rectangular tube. The two end portions of the flexible cable of this assembly are connected to these ferrules. The lower ferrule is mounted so that the position at which the cable extends upwardly from that ferrule is at horizontal plane containing the fulcrum axis of the primary lever.

The load cell of the scale is supported by and within an inverted channel iron that is securely mounted on the shallow rectangular tubing of the base. The load cell is located below the intermediate arm of the primary lever. The two ends of the vertical flexible cable of another assembly of upper and lower ferrules and cable are connected to the two ferrules. The lower ferrule is secured to the load cell. The upper ferrule is mounted on the distal end portion of the intermediate rectangular tube of the primary lever so that the position at which the flexible cable extends downwardly from the upper ferrule is also at the horizontal plane containing the fulcrum axis of the primary lever.

In view of the construction of the scale of the invention the addition of a weight on the platform provides a downward force from the horizontal tubes connected to the legs of the platform through the flexible cables to the distal end portions of the pairs of lever arms. This downward force on the pair of lever arms of the primary lever produces an upward force on the end of the intermediate arm. The downward force on the pair of arms of the secondary lever provides an upward force on its intermediate extension. That force is transmitted by the flexible cable to the intermediate arm of the primary lever. The combination of these two components of upward force is transmitted by the distal end portion of the intermediate arm of the primary lever to the load cell producing an analog signal in the load cell that can be converted to the digital value by one of a number of analog-to-digital conversion systems. Such conversion systems are well known in the art.

DESCRIPTION OF DRAWINGS

FIG. 1 is a front elevation of the preferred embodiment of the platform scale of the present invention, with the platform cover sheet partially broken away, with a part of the skirt around the sides of the scale shown in section, without the adjustable feet mounted on the base of the scale to support it in a level manner for use, and with a horizontal angle iron of the base broken away.

FIG. 2 is a longitudinal section of the scale without the skirt and the adjustable feet.

FIG. 3 is a cross section of the scale, partially broken away, taken along the line 3—3 of FIG. 1.

FIG. 3a is a cross section, taken along the line 3a—3a of FIG. 3, of the front arm of the primary lever showing its connection by the assembly of the upper eccentric ferrule, the flexible cable and the lower ferrule to one end portion of one of the horizontal members of the platform.

FIG. 3b is a cross section, taken along the line 3b—3b, of the rear arm of the primary lever showing its connection by the assembly of the upper centered ferrule, the flexible cable and the lower ferrule to the other end portion of the same horizontal member of the platform.

FIG. 4 is a cross section of the scale, partially broken away, taken along the line 4—4 of FIG. 1.

FIG. 5 is a cross section partially broken away, taken along the line 5—5 of FIG. 1 without the skirt.

FIG. 6 is a fragmentary cross section, taken along the line 6—6 of FIG. 1 showing one of the flexure plate mountings of the secondary lever to one of the front pair of vertical angle irons of the base.

FIG. 6a is a fragmentary cross section, taken along the line 6a—6a of FIG. 6.

FIG. 7 is a fragmentary cross section, taken along the line 7—7 of FIG. 1, showing one of the flexure plate mountings of the primary lever to the other of the front pair of vertical angle irons of the base.

FIG. 7a is a fragmentary cross section, taken along the line 7a—7a of FIG. 7.

FIG. 8 is a top plan of the scale showing only portions of the platform sheet and that is broken away to show the construction of the primary and secondary levers.

FIG. 8a is a fragmentary cross section, taken along the line 8a—8a of FIG. 8, showing the connection of the intermediate arm of the primary lever to the load cell.

FIG. 8b is a fragmentary gross section, taken along the line 8b—8b of FIG. 8, showing the connection of the secondary lever to the primary lever.

FIG. 9 is the bottom plan of the platform that is partially broken away.

FIG. 10 is a top plan of the primary lever of the scale.

FIG. 11 is a top plan of the secondary lever of the scale.

FIG. 12 is a top plan, partially broken away, of the base of the scale without the pair of horizontal angle irons.

FIG. 13 is a fragmentary cross section of the primary lever, taken along the line 13—13 of FIG. 11.

FIG. 14 is a fragmentary cross section of the primary lever, taken along the line 14—14 of FIG. 13.

DETAILED DESCRIPTION

As seen in FIG. 1, the preferred embodiment of the scale generally indicated at 16 includes a base generally indicated at 17, a lower primary U-shaped lever generally indicated at 18, an upper secondary U-shaped lever generally indicated at 19, a platform generally indicated at 20, a platform sheet 21, and a skirt 21'.

The base 17 has a unitary construction including, as seen in FIGS. 1, 5, 8 and 12, a shallow rectangular tubing 22, a front pair of vertical angle irons 23 and 24, a rear pair of vertical angle irons 25 and 26, front and rear horizontal angle irons 27 and 28, a horizontal inverted channel iron 29, and a pair of front and rear short inverted channel irons 30 and 31 that are mounted on the front pair of angle irons 23 and 24 and on the rear pair of angle irons 25 and 26, respectively. The open ends of tubing 22 are square at planes parallel to each other. One open end of tubing 22 is at the front portion of base 17. The front pair of vertical angle irons 23 and 24 are spaced from each other and are welded to the bottom and top walls of tubing 22 at its front end. The rear pair of angle irons 25 and 26 are similarly spaced from each other and welded to the rear end of tubing 22. The angle irons 23 through 26 extend above tubing 22 to a horizontal plane that passes through the top portion of secondary lever 19.

The load cell 33 (FIG. 2) is supported by screws (not shown) in holes 34 in the top wall of inverted channel iron 29 and load cell 33 is spaced from that wall by a mounting block 35. The top wall of shallow rectangular tubing 22 has a large top circular recess 36 adjacent the front end of tubing 22 (FIGS. 8 and 12). In recess 36 there is a number of threaded (not numbered) holes drilled in that area for mounting in recess 36 a level-indicating device (not shown).

The inverted channel iron 29 is welded at one end to one side of tubing 22 and extends toward one end of scale 16. The front horizontal angle iron 27 is welded to the front surface of the bottom portion of angle irons 23 and 24 and extends beyond tubing 22 to the front corner portions of scale 16. The rear horizontal angle iron is similarly connected to angle irons 25 and 26 and extends to the rear corner portions of scale 16. The angle iron 27 has its horizontal flange extending forwardly while angle iron 28 has its horizontal flange extending rearwardly.

The web (not numbered) of short inverted channel iron 30 is mounted on and welded to the top of angle irons 23 and 24 and short inverted channel iron 30 includes with the web a long flange and a short flange (both not numbered) that abut those flanges of angle irons 23 and 24 that abut the front end of tubing 22. As seen in FIG. 1 the bottom portion of the long flange of channel iron 30 is machined to provide a vertical flat surface 46. That portion is shown as an offset due to the removal of material to provide flat surface 46. The short flange of channel iron 30 is similarly machined but its length is sufficiently short so that essentially the entire length of the outer surface is machined to provide a vertical flat surface 47. These vertical flat surfaces 46 and 47 are parallel to each other. The short inverted channel iron 31 is similarly constructed with vertical flat surfaces 48 and 49. The channel iron 31 is mounted and welded on the top of angle irons 25 and 26 with its long flange at transverse vertical plane containing the long flange of channel iron 30 and with the short flange at the transverse vertical plane containing the short flange of channel iron 30. The vertical flat surfaces 46 and 48 of the long flanges of channel irons 30 and 31 are coplanar. The vertical flat surfaces 47 and 49 of the short flanges of channel irons 30 and 31 are coplanar. The distal end of each of the long flanges is above and adjacent the fulcrum axis of the primary lever while the distal end of the short flanges is above and adjacent the fulcrum axis of the secondary lever.

The lower primary U-shaped lever 18 has, in a unitary construction, a pair of arms 72 and 73 that extend from the same side of an elongated member 74 adjacent to its end portions 75 and 76, respectively. In this unitary construction lever 18 further includes an intermediate arm 77 that extends from the other side of elongated member 74 in a direction opposite to lever arms 72 and 73. The top horizontal surfaces of arms 72, 73 and 77 and elongated member 74 have their top surfaces coplanar. In this preferred construction lever arms 72 and 73, elongated member 74, and inermediate arm 77 are rectangular tubes with one end of each of arms 72 and 73 and arm 77 welded to the side walls of tube 74.

The end portion 76 of elongated member 74, that extends beyond lever arm 72, is U-shaped. It does not have the top wall and upper portion of side walls of the tubular member 74 between the end portions. The channel walls have their top edges slightly below the midpoint of the height of tubular portion of elongated member 74 from lever arm 72 to lever arm 73, so that the fulcrum axis of lever 18 is slightly above this top surface of the channel shaped end portion. The surface of the side wall of end portion 76, that faces in the same direction as lever arm 72, is a vertical flat surface 82 that is parallel to the vertical plane containing the longitudinal axis of elongated member 74. The end portion 75 is similarly constructed and has its vertical flat surface 83 coplanar with surface 82 of end portion 76. The distal end portions of arms 72, 73 and 77 are provided with slightly countersunk vertical holes (not numbered).

The upper secondary U-shaped lever 19 has, also in a unitary construction, a pair of arms 84 and 85 extending horizontally in the same direction from an elongated member 85' adjacent its end portions 86 and 87, respectively. The lever 19 has a short intermediate extension instead of an intermediate arm like arm 77 of lever 18. This intermediate short extension comprises a U-shaped bracket 88 that is welded to the side wall of elongated member 85' opposite to the side wall to which one end of lever arms 84 and 85 are welded. The lever arms 84 and 85 and elongated member 85' are rectangular tubes. The outside surfaces of top walls of lever arms 84 and 85 and elongated member 85' are coplanar. The end portions 86 and 87 are constructed in the manner described above for end portions 75 and 76 of lever 18. Thus they have coplanar vertical flat surfaces 90 and 91 parallel to the longitudinal axis of member 85' and facing the same direction as arms 84 and 85 extend. The distal end portions of lever arms 84 and 85 are provided with slightly countersunk vertical holes (not numbered).

The primary lever 18 is mounted on the long flange of channel irons 30 and 31 by a pair of flexure plates 94 and secondary lever 19 is mounted on the short flange of channel irons 30 and 31 by a pair of flexure plates 95 of the same construction as flexure plates 94. Illustratively for weighing a load of 25 pounds these flexure plates have a thickness of 0.006 inch and use spring steel. Each of these four flexure plates has four holes located in a rectangular pattern so that there are two holes on each side of and equally spaced from the center longitudinal line of the flexure plate. Each of the four holes is an equal distance from the central transverse line at which are located smaller holes having for each a center at a line that passes through the centers of two of the larger holes and parallel to the central longitudinal axis that is the flexure axis, i.e., fulcrum axis, of primary lever 18 or secondary lever 19, as the case may be.

As best seen in FIGS. 6 and 7 for angle irons 23 and 24, each of these vertical angle irons and vertical angle irons 25 and 26 has one flange abutting an end of shallow rectangular tubing 22 while the other flange of each angle iron extends inwardly and has its bottom portion removed. This other flange of these angle irons rests on the top wall of tubing 22 and is welded to it while the top wall of these angle irons by both of their flanges support channel irons 30 and 31.

The vertical flat surfaces 46 through 49 of the long and short flanges of channel irons 30 and 31 and the vertical flat surfaces 82, 83, 90 and 91 of end portions 75 and 76 of lever 18 and of end portions 86 and 87 of lever 19 are each provided with a pair of horizontal threaded holes and between them a smaller hole, with the three holes being in horizontal alignment and spaced from one another in the same manner as either of the three holes on opposite sides of the central line of each of the flexure plates. The top portion of each of the two plates 94 are mounted in abutment with flat surfaces 46 and 48 of the long flanges of inverted channel irons 30 and 31, while the bottom portion of each is mounted in abutment with flat surfaces 82 and 83 of end portions 76 and 75, respectively, of lever 18. The end portions 75 and 76 of lever 18 are spaced from and below the long flanges of channel irons 30 and 31. This mounting of flexure plates 94 is provided by screws 96 that pass through the larger holes in a pair of mounting clips 97 that abut the outer top portion of flexure plate 94 or the bottom portion of flexure plate 94 with the pair of mounting clips 97 spaced from the central line, i.e., flexure axis, of the flexure plate 94. Thus there are four mounting clips for mounting lever 18. Each of these clips 97 has these two larger holes on either side of the center line of the flexure plate and has an intermediate smaller hole positioned as in the case of either smaller hole of either flexure plate 94 for mounting end portion 75 or 76 of lever 18. By this construction flexure plates 94 are securely mounted on lever 18 and on the long flanges of channel irons 30 and 31 of base 17 for pivotal mounting of lever 18 below and above the flexure lines of plates 94. These flexure lines are coaxial and horizontal.

The lever 19 is similarly mounted for pivotal movement by the pair of flexure plates 95 on the short flanges of channel irons 30 and 31 of base 17 using four mounting clips 97 and eight screws 96.

The two smaller holes in each of flexure plates 94 and 95, the smaller hole in each of mounting clips 97, and those in end portions 75 and 76 of lever 18 and in end portions 86 and 87 of lever 19, as well as those in the long and short flanges are present for the placement of pins 98 used when assembling the components of scale 16.

The platform 20 is a unitary construction that includes a horizontal rectangular ring generally indicated at 99 (FIG. 9) having a front portion 100, a rear portion 101 and end portions 102 and 103. Between and spaced from portions 100 and 101 and on opposite sides of the longitudinal axis of platform 20 are elongated members 108 and 109 that are connected at their ends to end portions 102 and 103 of ring 99 to insure a rigid construction of this upper portion of platform 20. The platform 20 also has vertical legs 110 through 113 that extend downwardly. One pair of these legs, namely legs 110 and 111, depends from and are connected to the front corner portions of ring 99 while the other pair depends from and are connected to the rear corner portions of ring 99. The platform 20 has front and rear horizontal connecting rods 114 and 115 that are connected at their ends to the bottom portion of legs 110 and 111 and of legs 112 and 113, respectively. In addition, at the end portions of platform 20, there are horizontal members 116 and 117. The member 116 is connected to the bottom portion of legs 110 and 112 while member 117 is connected to the bottom portion of legs 111 and 113.

The ring 99, elongated members 108 and 109, and members 116 and 117 are constructed in this preferred embodiment of rectangular tubing. The legs 110 through 113 are constructed in the preferred embodiment of members having two flanges normal to each other, such as angle irons and channel irons. Angle irons are adequate to provide with connecting rods 114 and 115 and members 116 and 117 a rigidity of the legs to maintain members 116 and 117 at vertical planes transverse to and a fixed distance from the longitudinal axis of platform 20. One of these two flanges of each of legs 110 through 113 is at a vertical plane transverse to the longitudinal axis of platform 20 while the other flange is parallel to that longitudinal axis. The connecting rod 114 is connected to the flange of each of front legs 110 and 111 that are at transverse planes while the flanges of front legs 110 and 111 and rear legs 112 and 113 that are parallel to the longitudinal axis of platform 20 and connected to them are the front and rear ends of horizontal members 116 and 117. The member 116 is at an upper elevation while the member 117 is at a lower elevation for the reason described below.

The legs 110 through 113 are located as a part of platform 20 so that members 116 and 117 are below the distal end portions of lever arms 84 and 85 of secondary lever 19 and below lever arms 72 and 73 of primary lever 18, respectively. The member 116, that is at the upper elevation, of members 116 and 117, is spaced below distal arms 84 and 85 the same distance that member 117, that is at the lower elevation, is spaced below arms 72 and 73.

The members 116 and 117 have vertical holes (not numbered) that are in vertical alignment with the vertical holes in brazed bushings (not numbered) mounted in the distal end portions of arms 72, 73, 84 and 85 as described later. The connecting rods 114 and 115 and members 116 and 117 serve the function of gussets connected to the legs and to the upper part of the platform of the construction of the embodiment disclosed in said copending patent application. The members 116 and 117 provide the four feet in the structure of that embodiment. Each of members 116 and 117 provides means of connecting platform 20 to the distal end portions of arms of one of the levers. Because of this construction other gussets used with the feet in the construction of the embodiment in said copending application are also unnecessary.

Through the distal end portion of intermediate arm 77 of lever 18 there is a slightly countersunk vertical hole (not numbered) in which is fixedly mounted, by brazing, a bushing (not numbered) having inserted in its vertical hole an adjust bushing (not numbered) having a threaded vertical hole and a central annular recess, i.e., a portion of reduced diameter, and a top portion of larger diameter that rests on the brazed bushing. Mounted in this threaded hole is one of five flexible cable ferrules 122 (FIG. 2). The adjust bushing can be turned by loosening screws 123 that are in threaded holes in the central portion of smaller diameter of the brazed bushing so that a ferrule 122 can be adjusted up or down when it is necessary without turning flexible cable 124 that has its top end portion secured in the vertical hole of ferrule 122. This vertical adjustment of ferrule 122 without twisting of cable 124 occurs during the horizontal orientation of arm 77 as seen later. When that connection and adjustment is completed screws 123 are turned into abutment with the central recess portion of the adjust bushing so that it is fixed in position relative to the brazed bushing fixedly mounted on arm 77. A lock nut (not numbered), see FIG. 8a, secures ferrule 122 to the adjust bushing.

Each of lever arm 72 of lever 18 and lever arm 85 of lever 19 has mounted on their slightly countersunk vertical holes at the distal end portions a bushing (not numbered) that is brazed to the associated arm to be fixed in position. The top portion of this bushing has a larger diameter than the bottom portion. The top portion fits partially in the countersunk part of the vertical hole. The bottom portion extends below the top wall of the lever arm and its bottom end portion has radial threaded holes in which are located screws 123 that engage an annular recess portion of another ferrule 122 that extends through the brazed bushing and that has an upper portion with a sufficiently large diameter to abut the top of the brazed bushing in the arm of the lever. These ferrules are fixed in position by screws 123 engaging the annular recess portion of each ferrule 122.

In each of the slightly countersunk holes in arms 73 and 84 of lever 18 and 19 are mounted bushings as described above for the bushings in arms 72 and 85. These two bushings are also brazed to their associated arms. The ferrules 122 that are mounted in the bushings of arms 73 and 84 have centered holes from one end to the other. In each of these centered holes is secured the upper end portion of a flexible cable 124. Each of ferrules 122 that are mounted in bushings on arms 72 and 85, have a hole that extends from one end to the other but it is offset from the longitudinal axis of ferrule 122 to provide an eccentric mounting of the upper portion end of flexible cables 124 for their connection to arms 72 and 85 of levers 18 and 19. With this construction of connecting the top ends of cables 124 to arms 72 and 85 the top ends of these cables 124 can be moved for adjustment by rotating ferrules 122 after loosening screws 123, that engage the annular recess portions of ferrule 122. This adjustment is made as a part of the adjustment of scale 16 in essentially the same manner as the scale of the embodiment described in said copending application. These constructions of centered and eccentric mounting of ferrules 122 on arms 73 and 84 and on arms 72 and 85, respectively, are shown in FIGS. 3b and 3a, respectively.

The U-shaped bracket 88 that is welded to one side wall of elongated member 85' of upper lever 19 is located above intermediate arm 77 of lower lever 18. The bracket 88 has horizontal angular extensions from the distal portion of its vertical flanges and angular extensions have coplanar flat top surfaces that are preferably coplanar with the top surface of elongated member 85'. A mounting sled 128 has a bottom portion 128' that is U-shaped with its vertical flanges of lesser depth than those of bracket 88 so that the web of portion 128' of sled 128 is spaced above the web of bracket 88. The portion 128' of sled 128 has angular extensions from distal ends of its vertical flanges. These angular extensions rest on those of bracket 88. These horizontal angular extensions of portion 128' have elongated slots (not numbered) through which pass screws (not numbered) that extend into vertical threaded holes (not numbered) in the angular extensions of bracket 88 to prevent movement of sled 128 relative to bracket 88.

The sled 128 also has a plate 129 welded on these angular extensions of portion 128'. The plate 129 extends beyond portion 128' and beyond the distance that bracket 88 extends from member 85' (FIG. 8b). The plate 129 has a vertical hole that is mostly beyond that end of bracket 88. The web of portion 128' has a downwardly turned extension at the end that is remote from member 85'. The vertical surface (an extension of the top surface of the web) of that downwardly turned portion of the web is at a vertical plane containing the center of the hole of plate 129 and in alignment with that center the surface of the downwardly turned extension of the web has a vertical notch. A pair of threaded horizontal holes (not numbered) are in this downwardly turned extension of the web of portion 128' of sled 128 and these holes are on opposite sides of the vertical notch. The other end of the web of portion 128' has an upwardly turned extension that has a pair of spaced horizontal holes (not numbered) also on opposite sides of the longitudinal plane of sled 128. One of these holes is threaded. Screws 132 extend through these holes. The screw 132 that extends through the threaded hole abuts the adjacent side wall of elongated member 85' while the other screw 132 is threaded into a hole in that side wall of member 85' as seen in FIG. 2.

A pair of screws 132' extend through holes in a clamp member 133 mounted on the downwardly turned extension of the web of portion 128' and screws 132' extend in threaded holes in that downwardly turned extension. The clamp member 133 has a vertical notch facing the vertical notch on the downwardly turned web extension of portion 128'. This pair of notches provides a vertical opening through which passes a cable 124. The top end portion of that cable is secured in a vertical hole of a cable ferrule 139 that is threaded into a bushing (not numbered) that is mounted on plate 129 and extends through its hole mentioned above. That bushing has a central annular recess and screws (not shown), in threaded horizontal holes of plate 129 that are 90° from each other and are at the radii of that hole of plate 129, engage the bushing at that annular recess. After the scale has been adjusted, screws 132' have clamp member 133 abutting the downwardly turned flange of the web of portion 128' of sled 128 to clamp cable 124 tightly in position. At this time the screws through the horizontal angular extensions of the flanges of portion 128' tightly engage these extensions against bracket 88 to prevent movement of sled 128 relative to bracket 88. At that time also one of screws 132 abuts member 85' and the other is adjustably threaded into member 85' so that sled 128 is accurately spaced from member 85' for the proper location of the top part of cable 124.

An adjustment bushing 137 having a top end of larger diameter and an intermediate annular recess is mounted on plate 129 at its vertical hole. The bushing 137 extends below plate 129. The annular recess of bushing 137 is in alignment with horizontal threaded holes in plate 129 that extend to the vertical hole and screws (not numbered) engage bushing 137 at its annular recess.

The bottom end portions of each of cables 124, that are mounted on arm 73 of lever 18 and arm 84 of lever 19 by ferrules 122 as described above, are secured in longitudinal holes drilled in ferrules 143. Each of ferrules 143 (FIG. 3b) is a cylindrical rod with a center portion that is of larger diameter and that is externally threaded. The treaded portion of each ferrule 143 is in a vertical threaded hole in a boss 143'. Each of bosses 143' has a bottom end portion of smaller diameter that extends through the top portion of the rear hole of the holes of each of members 116 and 117 of platform 20. The boss 143' is welded to the assocaited member 116 or member 117. Outwardly movement of ferrules 143 is prevented by nuts (not numbered) mounted on top end portion of ferrules 143 and abutting bosses 143'.

The bottom end portions of each of cables 124 that are mounted on arm 72 of lever 18 and arm 85 of lever 19 by ferrules 122 as described above, are in longitudinal holes in ferrules 143 and secured to these ferrules.

Each ferrule 143 (FIG. 3a) is a cylindrical rod having an externally threaded central portion of larger diameter. Each ferrule 143 is in a vertical threaded hole in a boss assembly that includes an adjust sleeve 143'' that has an enlarged diameter at its bottom end portion, and has an annular recess at its top end portion. The sleeve 143'' is mounted in a longitudinal vertical hole of a boss 143''' so that the enlarged bottom end portion of sleeve 143'' abuts the bottom end of boss 143''', the top end portion of sleeve 143'' extends above the top end of boss 143''', and the annular recess of sleeve 143'' is aligned with radial threaded holes in boss 143''''. Screws 142 in these radial holes engage sleeve 143'' at its annular recess. The top portion of the longitudinal hole in sleeve 143'' is threaded while the bottom portion of that hole has a larger diameter. A nut (not numbered) is mounted on the top end of ferrule 143 and abuts the sleeve 143'' of the boss assembly. A nut (not numbered) is also mounted on each of ferrules 143 that are threaded in each boss 143''' mounted on members 116 and 117 below arms 73 and 84.

The top surface of channel iron 30 of base 17 has a pair of spaced coplanar horizontal flat surface portions (not shown) above angle irons 23 and 24. The top surface of the proximal portion of tubular arm 72 and the adjoining portion of the top surface of member 74 are coplanar horizontal flat surfaces (not shown). The top surface of the proximal portion of tubular arm 85 and the adjoining portion of the top surface of member 85' are coplanar horizontal flat surfaces. The top flat surfaces of bushings (not numbered), that are mounted and brazed on arms 72, 73, 84 and 85, are reference surfaces in the fabrication of the levers. The horizontal flat surface portions on arms 72 and 85 and adjoining portions of members 74 and 85' of levers 18 and 19, those on the bushings mounted on arms 72 and 85, and those on channel iron 30 are used as reference surfaces during the assembly of the scale in a manner that is essentially the same as described in said copending application for the assembly of the embodiment disclosed there.

By the foregoing construction of scale 16 each of the two lever arms of the two levers is connected and supports, through members 116 and 117, the four vertical legs 110 through 113. A weight placed on platform cover sheet 21 and thus on platform 20 provides a downward force on four flexible cables 124 attached to these lever arms and thereby provides a downward movement of these arms of the levers. The downward movement of lever 19 provides an upward movement of bracket 88 and sled 128 and thus an upward movement of flexible cable 124 connected by ferrule 139.

The machined flat surface on top of the bushings mounted on the distal end portions of arms 72, 73, 84 and 85 are also used when mounting the ferrules in these arms of levers 18 and 19 so that cables 124 at the bottom surface of ferrules 122 are slightly above the fulcrum axis of the lever having these bushings when there is no load on scale 16. Then, when there is a load on scale 16 that is the median weight of the weight capacity of the scale, that part of cables 124 at the bottom end of ferrules 122 are at the horizontal plane containing the fulcrum axis of the lever to which the particular cables 124 are connected.

In the assembled scale 16 a ferrule 144, that has a central threaded portion of larger diameter, is secured on the bottom end portion of that cable 124 secured on its top end to ferrule 122 threaded in the adjust bushing mounted on a bushing brazed on the distal end portion of arm 77 of lever 18. When assembling scale 16, the assembly of ferrule 144, flexible cable 124 and ferrule 122 is dropped in the hole of the distal end of arm 77 until the bottom end of ferrule 144 is at a vertical threaded hole in a plate of load cell 33. The assembly of ferrule 144, cable 124 and ferrule 122 is rotated about the vertical axis to thread ferrule 144 in that plate of load cell 33 to provide an adequate connection between load cell 33 and arm 77. Ferrules 122 and 144 and cable 124 are turned as a unit until the part of cable 124 at the bottom end of ferrule 122 is at the same horizontal plane containing the fulcrum axis of lever 18 when the bottom end of ferrules 122 on arms 72 and 73 are at that horizontal plane. When this adjustment has been completed screws 123 are turned to engage the adjust bushing. Also a nut 144' is threaded on the bottom end of the threaded central portion of ferrule 144 until it abuts the plate of load cell 33.

The bottom end portion of cable 124, that has its top end portion connected to ferrule 139, is secured in the longitudinal hole of a ferrule 145 that has an upper externally threaded central portion of larger diameter and a lower central portion of still larger diameter. The assembly of cable 124 and ferrules 139 and 145 is inserted up into arm 77. The ferrule 145 is turned until it locks in arm 77. The adjust bushing is then used to orient lever 19 into the horizontal. Then the adjust bushing is locked by screws 123. The bottom end of ferrule 145 is at the horizontal plane containing the fulcrum axis of lever 18 when the bottom end of ferrules 122 are mounted on arms 72 and 73 are at that horizontal plane.

After the assembly of scale 16 in the manner essentially described in said copending application a weight is placed on the four corners for any necessary adjustment at the interconnection of the two levers and then the two eccentric connections of arm 72 of lever 18 and arm 85 of lever 19 in the manner described in that application. The adjustment at the lever interconnection is made by loosening the screws passing through the angular extensions of U-shaped sled 128 and engaging the angular flanges of bracket 88 and a turning of screws 132 to shift ferrule 139 toward or away from member 85' of lever 19 by a movement of sled 128 until the weight displayed is satisfactory and finally the screws, that pass through the angular extensions of sled 128, are tightened to fix sled 128 at this new position.

On the central portion of the opposing side walls of the front and rear portions of ring 99 of platform 20 are mounted a pair of inwardly directed horizontal channel members 153 and 154, each of which has a vertical hole in the distal portion of its web. These vertical holes are in alignment with channel members 30 and 31 of base 17 on each of which is mounted by screws (not numbered) a mounting clip 155 having a central hole that is countersunk at its bottom portion. In this hole is mounted a bumper check 165 that has an upper cylindrical portion having a slightly smaller diameter than the vertical hole in channel members 153 and 154 through which this upper portion of bumper checks 165 extend when platform 20 is mounted in position. These bumper checks 165 do not interfere with the vertical movement of platform 20 but limit lateral movement.

The horizontal flanges of angle irons 27 and 28 have vertical holes at their end portions on which are mounted leveling bolts 167 (FIGS. 3 and 4) that serve as adjustable legs for base 20. When bolts are adequately adjusted so that the level-indicating device (not shown) indicates base 20 is level, nuts 168 on the threaded shank of bolts 167 are turned to abut the bottom surface of angle irons 27 and 28.

At spaced positions on the horizontal flange of angle irons 27 and 28 there are other holes in which are mounted locating pins 169 that extend through the horizontal flanges of clips 170 mounted on the bottom portion of rectangular shroud or skirt 21' to hold it in position when it is lowered. Of course, this is before platform sheet 21 is placed on platform 20.

As seen in FIG. 5 the side walls of shallow rectangular tubing 22 have, at their end portions, notches 172 to provide clearance for passage of connecting rods 114 and 115.

In the foregoing description of the preferred embodiment of scale of the invention various commercially available products in the form of rectangular tubes and angle irons are used to make the levers and the platform. It is within the scope of the invention that some of these can be replaced by other products, for example, plates in place of tubular members 116 and 117 and channel irons in place of angle irons 110 through 113. However, the specific products used in the preferred embodiment provide adequate rigidity for accuracy of weighing while providing a scale with less weight.

The foregoing description has been presented solely for the purpose of illustration and not by way of limitation of the invention because the latter is limited only by the claims that follow.

I claim:
1. A platform scale comprising
    a horizontal base including in a unitary construction:
        a horizontal shallow rectangular tubing at the central portion of the scale, said shallow tubing having its longitudinal axis transverse to the longitudinal axis of said scale and of said base with the ends of said shallow tubing being at the front and rear portions of the base;
        a front spaced pair of vertical mounting members having for each a first vertical flange abutting and secured to the front end of said shallow tubing and a second flange normal to said first flange and having its bottom end abutting and secured to the front end portion of the top wall of said shallow tubing, said first and second flanges having their top ends at a horizontal plane;
        a rear spaced pair of vertical mounting members having for each a first vertical flange abutting and secured to the rear end of said shallow tubing and a second flange normal to said first flange and having its bottom end abutting and secured to the rear end of portion of the top wall of said shallow tubing, said first and second flanges having their top ends at a horizontal plane and said second flanges of said second pair of said vertical mounting members being at the transverse vertical planes of the scale at which are located said second flanges of said first pair of said vertical mounting members;
        a horizontal load cell mounting member secured to the central portion of one side wall of said shallow tubing and extending toward one end of said scale;
        a front short inverted channel member fixedly mounted on the top ends of said flanges of said front pair of vertical mounting members having a short vertical flange with at least its bottom portion at an upper elevation having a flat vertical outer surface facing one end of said base at a vertical plane normal to the longitudinal axis of said base and a long flange with its bottom portion at a lower elevation having a vertical flat outer surface facing the other end of said base at a vertical plane normal to the longitudinal axis of said base; and a rear short inverted channel member fixedly mounted on top ends of said flanges of said rear pair of vertical mounting members, said rear inverted channel member having a short vertical flange with at least its bottom portion at an upper elevation having a flat vertical outer surface facing said one end of said base at a vertical plane normal to the longitudinal axis of said base and a long flange with its bottom portion at a lower elevation having a vertical flat outer surface facing the other end of said base at a vertical plane normal to the longitudinal axis of said base and said vertical flat outer surfaces of said short and long flanges of said rear channel member being coplanar with and at the same elevations of said vertical flat surfaces of said short and rear flanges of said front channel member, respectively;

a primary U-shaped lever having in a unitary construction:

a horizontal mounting rectangular tube having at its end portions only the bottom wall and the bottom portion of the side walls of the tube;

a pair of rectangular tubes, as lever arms, spaced from each other and extending horizontally from the same one side wall of said mounting tube adjacent its end portions; and an intermediate rectangular tube extending horizontally from said mounting tube in a direction that is normal to the longitudinal axis of said mounting tube and from the other side wall of said mounting tube, said end portions of said mounting tube of said primary lever extending axially beyond said pair of lever tubes and having coplanar vertical flat surface portions on their side walls facing in the general direction that said lever tubes extend;

a secondary U-shaped lever having in a unitary construction:

a horizontal mounting rectangular tube having at its end portions only the bottom wall and the bottom portion of the side walls of the tube;

a pair of rectangular tubes, as lever arms, spaced from each other and extending horizontally from the same one side wall of said mounting tube adjacent its end portions; and a short member normal to the longitudinal axis of said mounting tube extending horizontally from an intermediate portion of its other side wall; said end portions of said mounting tube of said secondary lever extending axially beyond said pair of lever tubes and having coplanar vertical flat surface portions on their side walls facing in the general direction that said lever tubes extend;

means, including a first pair of flexure plates, pivotally mounting said primary lever on said long flanges of said front and rear inverted channel members of said base with said pair of lever tubes of said primary lever to positions above front and rear corner portions of said other end of said scale, said mounting means connecting said primary lever at its said coplanar vertical flat surface portions of said end portions of its said mounting tube to the lower horizontal marginal portions of said first pair of flexure plates and connecting said long flanges of said front and rear inverted channel members at their said vertical flat surfaces to said first pair of flexure plates at the upper marginal portions of said first pair of flexure plates to provide a common horizontal flexure axis transverse to the longitudinal axis of said scale and to provide the end portions of said mounting tube of said primary lever vertically spaced from said long flanges of said front and rear inverted channel members;

means, including a second pair of flexure plates, pivotally mounting said secondary lever on said short flanges of said front and rear inverted channel members of said base with said pair of lever tubes of said secondary lever to positions above front and rear corner portions of said one end of said scale, said mounting means connecting said secondary lever at its said coplanar vertical flat surface portions of said end portions of its said mounting tube to the lower horizontal marginal portions of said second pair of flexure plates and connecting said short flanges of said front and rear inverted channel members at their said vertical flat surfaces to said second pair of flexure plates at the upper marginal portions of said second pair of flexure plates to provide a common horizontal flexure axis transverse to the longitudinal axis of said scale and to provide the end portions of said mounting tube of said secondary lever vertically spaced from said short flanges of said front and rear inverted channel members;

a platform including in a unitary construction:

a horizontal rectangular ring having front and rear portions, a first end portion at said one end of said scale, and a second end portion at said other end of said scale, said ring having front and rear corner portions;

a first pair of downwardly extending vertical legs connected to said tubular ring at its front and rear corner portions at said one end of said scale;

a second pair of downwardly extending vertical legs connected to said tubular ring at its front and rear corner portions at said other end of said scale;

a front horizontal rod connecting the bottom end portions of said front legs of said pairs of legs;

a rear horizontal rod connecting said rear legs of said pairs of legs;

a first horizontal member connected at its ends to said front and rear legs of said pairs of legs at said one end of said scale, said connecting member being at an upper elevation below said pair of lever tubes of said secondary lever; and a second horizontal member connected at its ends to said front and rear legs of said pairs of legs at said other end of said scale, said connecting member being at a lower elevation below said pair of lever tubes of said primary lever;

means connected to the distal end portions of said lever tubes of said primary lever to intermediate portions of said second horizontal member of said platform to provide a part of support of said platform by said lever arms;

means connected to the distal end portions of said lever tubes of said secondary lever to intermediate portions of said first horizontal member of said platform to provide a part of support of said platform by said lever arms;

means connected to said short member extending horizontally from said intermediate portion of said side wall of said mounting member of said secondary lever and to said intermediate tube of said primary lever at a location spaced from distal end portion of said intermediate tube and spaced from said mounting tube of said primary lever, said short member of said secondary lever and said intermediate tube of said primary lever being located on said lever so that said short member is directly above said intermediate tube;

load cell means mounted on said load cell mounting member of said base below the distal end portion of said intermediate tube of said primary lever; and means connected to said distal end portion of said intermediate tube and to said load cell means to provide a stress in said load cell means when said intermediate tube is raised.

2. The scale of claim 1 wherein:

each of said distal end portions of said pairs of lever tubes has a vertical hole through its top and bottom walls;

each of said first and second horizontal members of said platform has a pair of vertical holes located below said vertical holes in said distal portions of said pairs of lever tubes of said levers;

said means connecting distal end portions of said lever tubes of said primary lever to said second horizontal member of said platform and said means connecting said distal end portions of said lever tubes of said secondary lever to said first horizontal member of said platform comprises four flexible cable assemblies, each assembly including:

a vertical flexible cable;

a bottom ferrule mounted in one of said vertical holes of said first and second horizontal members of said platform, said bottom ferrule having a vertical hole in which the bottom end portion of said flexible cable is secured; and a top ferrule mounted on one of said lever tubes in said hole at its distal end portion, said top ferrule having a vertical hole in which the top end portion of said flexible cable is secured;

said intermediate tube of said primary lever having a vertical hole through its top and bottom walls at a position at least adjacent a transverse vertical plane passing through said short member of said secondary lever;

said means connecting said short member of said secondary lever and said intermediate tube of said primary lever comprising:

means adjustably mounted on said short member of said secondary lever; and a fifth flexible cable assembly having its top ferrule mounted on said adjustable means mounted on said short member of said secondary lever and having said bottom ferrule mounted on said intermediate tube of said primary lever;

said intermediate tube of said primary lever has at its distal end portion a vertical hole through its top and bottom walls; and said means connecting said distal end portion of said intermediate tube comprises a sixth flexible cable assembly having its bottom ferrule connected to said load cell means and connected to the bottom portion of the flexible cable of that cable assembly, and having its top ferrule mounted in said vertical hole of said distal end portion of said intermediate tube of said primary lever with the top portion of that flexible cable connected to that top ferrule.

3. The scale of claim 2 wherein:

the bottom end of the connection of said top ferrules to the top end portions of said cables of those cable assemblies mounted on the distal end portion of said pair of lever tubes of said primary lever are bottom ends substantially at the horizontal plane at which is located the flexure axis of the pivotal mounting of said primary lever;

the bottom end of the connection of said top ferrules of those cable assemblies mounted on the distal end portion of said pair of lever tubes of said secondary lever are substantially at the horizontal plane at which is located the flexure axis of the pivotal mounting of said secondary lever;

the top end of the connection of said bottom ferrule of the bottom end portion of said cable of said fifth cable assembly is substantially at the horizontal plane at which is located the flexure axis of pivotal mounting of said primary lever; and the bottom end of the connection of said top ferrule to the top end portion of said cable of said sixth cable assembly is substantially at the horizontal plane at which is located the flexure axis of pivotal mounting of said primary lever.

4. The scale of claim 3 wherein said first and second members of said platform are mounted at upper and lower elevations and said four flexible assemblies are mounted so that the distances between the connection of the bottom end and top end of the top and bottom ferrules, respectively, to the end portions of said cables are the same.

5. The scale of claim 4 wherein:

said ring of said platform is tubular that is rectangular in cross section;

said pairs of legs of said platform are angular members with the first flange of each of the two pairs of legs being parallel to the longitudinal axis of said scale and the second flange of each of the pairs of legs being normal to the longitudinal axis of said scale;

said front and rear connecting rods of said platform are connected to said second flanges of said pairs of legs; and said first and second horizontal members of said platform are rectangular tubes connected to said first flanges of said legs.

6. The scale of claim 5 wherein:

said short member of said secondary lever is a horizontal short channel member having horizontal angular extensions from the distal ends of its flanges, each of said extensions having a vertical threaded hole; and said adjustably mounted means mounted on said short member comprises:

a channel-shaped sled having horizontal angular extensions at the distal ends of the flanges, with a slot for each extension above the threaded holes in the angular extensions of said short member, having an upwardly turned extension of one end of its web facing said mounting member of said secondary lever, having a vertically notched downwardly turned extension of the other end of its web, and having a plate fixedly mounted on the horizontal angular extensions and extending horizontally beyond said downwardly turned extension of said web;

screw means through said upwardly turned web extension to adjustably move said sled along said short member;

screw means through said slots to secure said sled on said short member;

said top ferrule of said fifth cable assembly being mounted on said plate of said sled;

clamp means mounted on said downwardly turned extension of said web and having a vertical notch facing said notch on said downwardly turned web extension to secure said cable of said fifth cable assembly so that the plane at which the bottom portion of the mounting clip secures that cable is substantially at the horizontal plane at which is located the flexure axis of pivotal mounting of said secondary lever.

7. The scale of claim 6 and further including:

means fixedly mounted on top the central portion of each of said front and rear short inverted channel members of said base, said means including an upstanding cylindrical member; and inwardly directed channel members fixedly mounted on said front and rear portions of said ring of said platform at the transverse vertical plane of the assembled scale passing through said upstanding cylindrical members, each of said channel members having a vertical hole in its web slightly larger than the diameter of said upstanding cylindrical member and the length of said end portions of said ring of said platform is such that in the assembled scale said upstanding portions extend through said holes in said webs and limit lateral movement of said platform.

8. The scale of claim 6 wherein:

said means connecting distal end portions of said lever tubes of said levers further includes for each:

a bushing, with a vertical hole, fixedly mounted on the top wall of the lever tube in its said hole and extending downwardly from that top wall; and screws threadably mounted in said bushing and extending inward radially of said vertical hole of said bushing below said top wall of the lever tube; and each of said top ferrules of said four flexible cable assemblies being mounted on said bushings in their vertical holes, each top ferrule having an intermediate portion of larger diameter than its end portions with an annular recess engaged by said screws in said bushing and the top ferrules of the two of said flexible cables mounted in the lever tubes of the levers of the front portion of the scale having their vertical holes eccentric to the longitudinal axis of those ferrules for adjustable positioning of the top portion of the cable by rotation of that top ferrule after loosening said screws.

* * * * *

UNITED STATES PATENT AND TRADEMARK OFFICE
CERTIFICATE OF CORRECTION

PATENT NO. : 3,931,860
DATED : January 13, 1976
INVENTOR(S) : Chester S. Czyryk

It is certified that error appears in the above-identified patent and that said Letters Patent are hereby corrected as shown below:

Column 1, Line 7, "3,895,595" should read --3,894,595--.

Column 8, Line 57, "inermedi-" should read --intermedi- --.

Column 13, Line 61, "assocaited" should read --associated--.

Signed and Sealed this twentieth Day of April 1976

[SEAL]

Attest:

RUTH C. MASON
Attesting Officer

C. MARSHALL DANN
Commissioner of Patents and Trademarks